US00RE42027E

(19) United States
(12) Reissued Patent
Kumazawa

(10) Patent Number: US RE42,027 E
(45) Date of Reissued Patent: Jan. 18, 2011

(54) CHAIR

(75) Inventor: Taku Kumazawa, Ichinomiya (JP)

(73) Assignee: Aichi Co., Ltd, Aichi-ken (JP)

(21) Appl. No.: 29/316,587

(22) Filed: Oct. 9, 2009

Related U.S. Patent Documents

Reissue of:
(64) Patent No.: Des. 600,465
Issued: Sep. 22, 2009
Appl. No.: 29/336,793
Filed: May 8, 2009

(51) LOC (9) Cl. ..... *06 01*
(52) U.S. Cl. ..... D6/373
(58) Field of Classification Search ..... 115/334–336, 115/369, 371, 372, 373, 374, 375, 376, 379, 115/380, 500–502; 297/183.7, 239, 445.1, 297/447.1, 447.3, 447.4, 448.1, 448.2, 451.7, 297/452.18, 452.64
See application file for complete search history.

(56) References Cited

U.S. PATENT DOCUMENTS

| | | | |
|---|---|---|---|
| 1,960,022 | A | 5/1934 | Melder |
| D112,866 | S | 1/1939 | Vavrik |
| D149,980 | S | 6/1948 | Spence |
| D149,982 | S | 6/1948 | Sundberg |
| D202,775 | S | 11/1965 | Rowland |
| 3,404,916 | A | 10/1968 | Rowland |
| 3,724,897 | A | 4/1973 | Faiks et al. |
| 3,815,955 | A | 6/1974 | Gibilterra |
| 3,913,978 | A | 10/1975 | Lester |
| D241,487 | S | 9/1976 | Gibilterra |
| 3,999,802 | A | 12/1976 | Powers |
| 4,049,315 | A | 9/1977 | Jacobson |

(Continued)

FOREIGN PATENT DOCUMENTS

EP 000606009-0010 S 11/2006

OTHER PUBLICATIONS

Unpublished U.S. Appl. No. 29/355,483.
Unpublished U.S.Appl. No. 29/355,484.
Unpublished U.S. Appl. No. 29/336,789.
Unpublished U.S. Appl. No. 29/336,791.
Unpublished U.S. Appl. No. 29/336,793.

(Continued)

*Primary Examiner*—Mimosa De
(74) *Attorney, Agent, or Firm*—Vincent K. Gustafson; Intellectual Property/Technology Law

(57) CLAIM

The ornamental design for a chair, as shown and described.

DESCRIPTION

[FIG. 1 is a perspective view of a chair showing my new design;]
[FIG. 2 is a front elevation view of the chair;]
[FIG. 3 is a rear elevation view of the chair;]
[FIG. 4 is a left side elevation view of the chair;]
[FIG. 5 is a top plan view of the chaie; and, ]
[FIG. 6 is a bottom plan view of the chair.]
*FIG. 7 is a perspective view of a chair showing my new design;*
*FIG. 8 is a front elevation view of the chair;*
*FIG. 9 is a rear elevation view of the chair;*
*FIG. 10 is a left side elevation view of the chair;*
*FIG. 11 is a top plan view of the chair; and,*
*FIG. 12 is a bottom plan view of the chair.*
The right side elevation view of the chair is a mirror image of the left side elevation view thereof.

1 Claim, 12 Drawing Sheets

Figure 1:
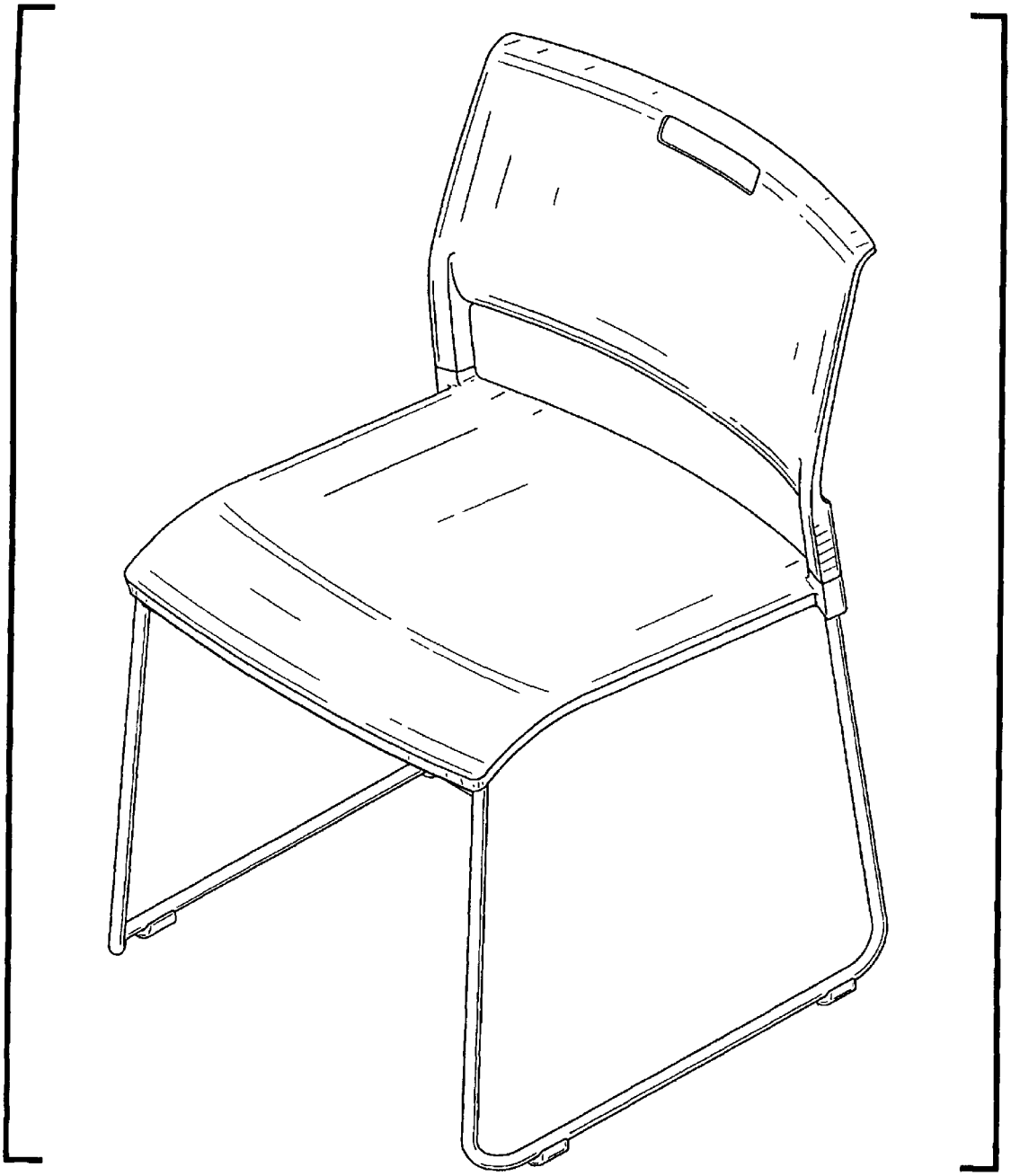
Figure 2:
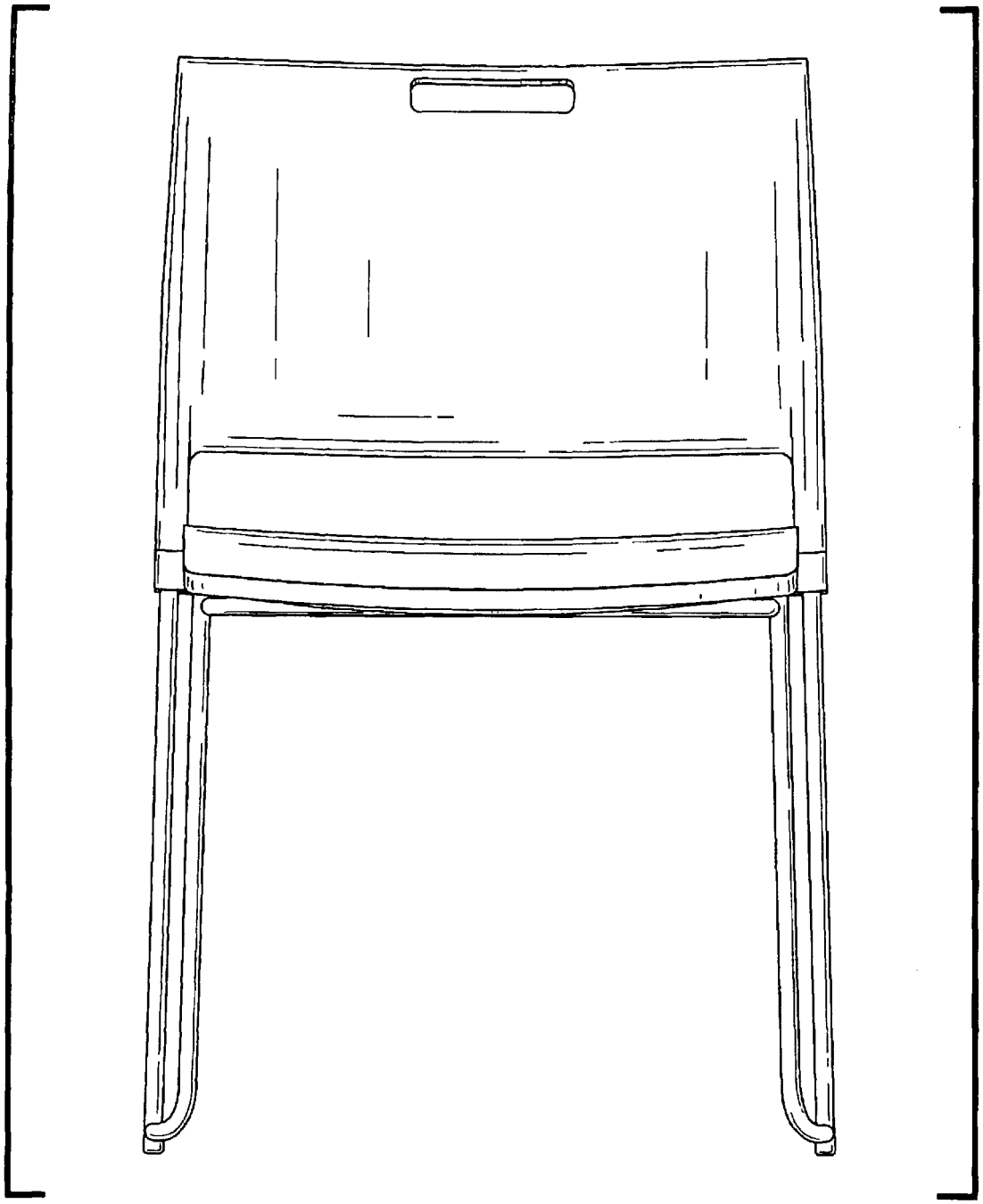
Figure 3:
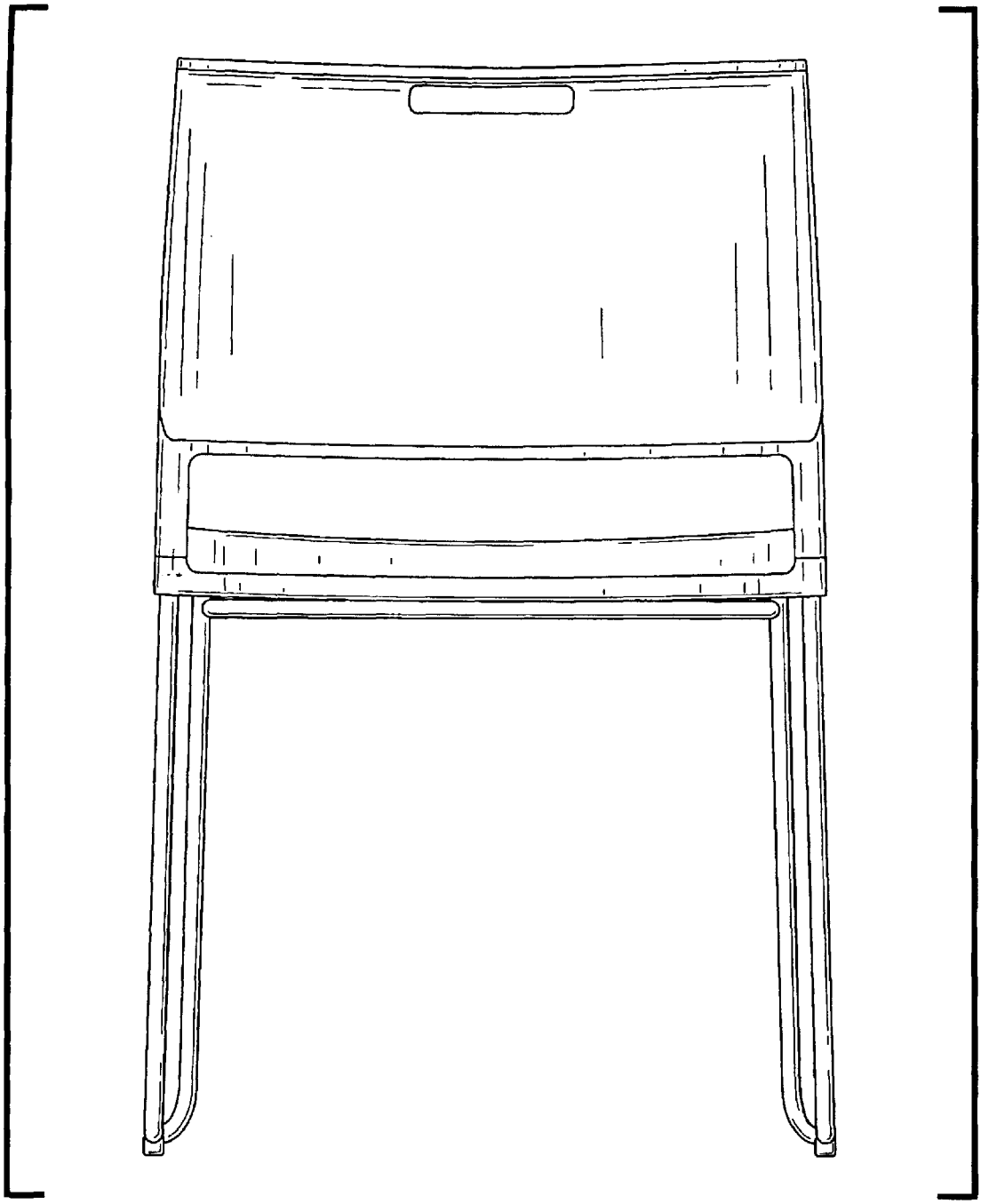
Figure 4:
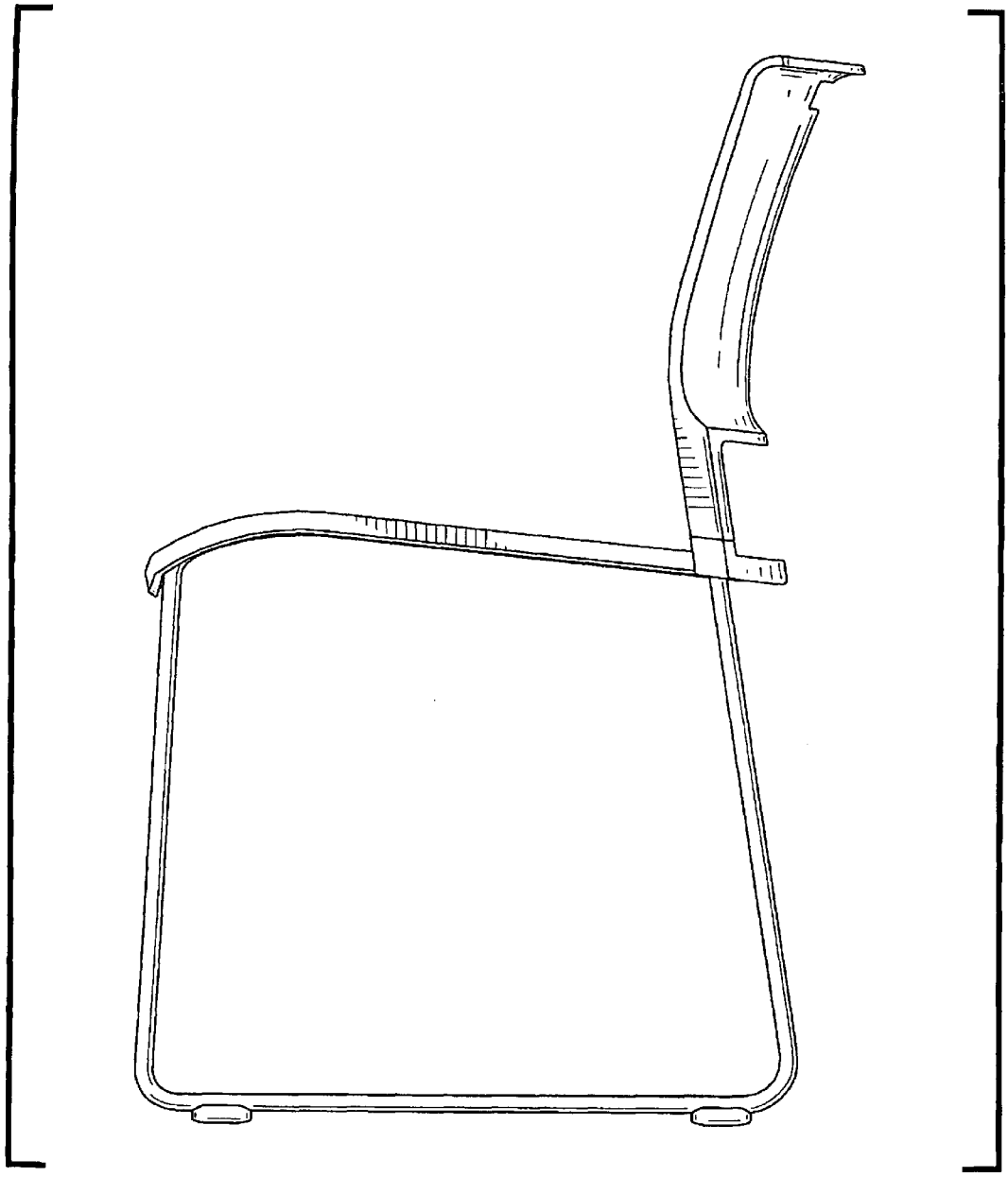
Figure 5:
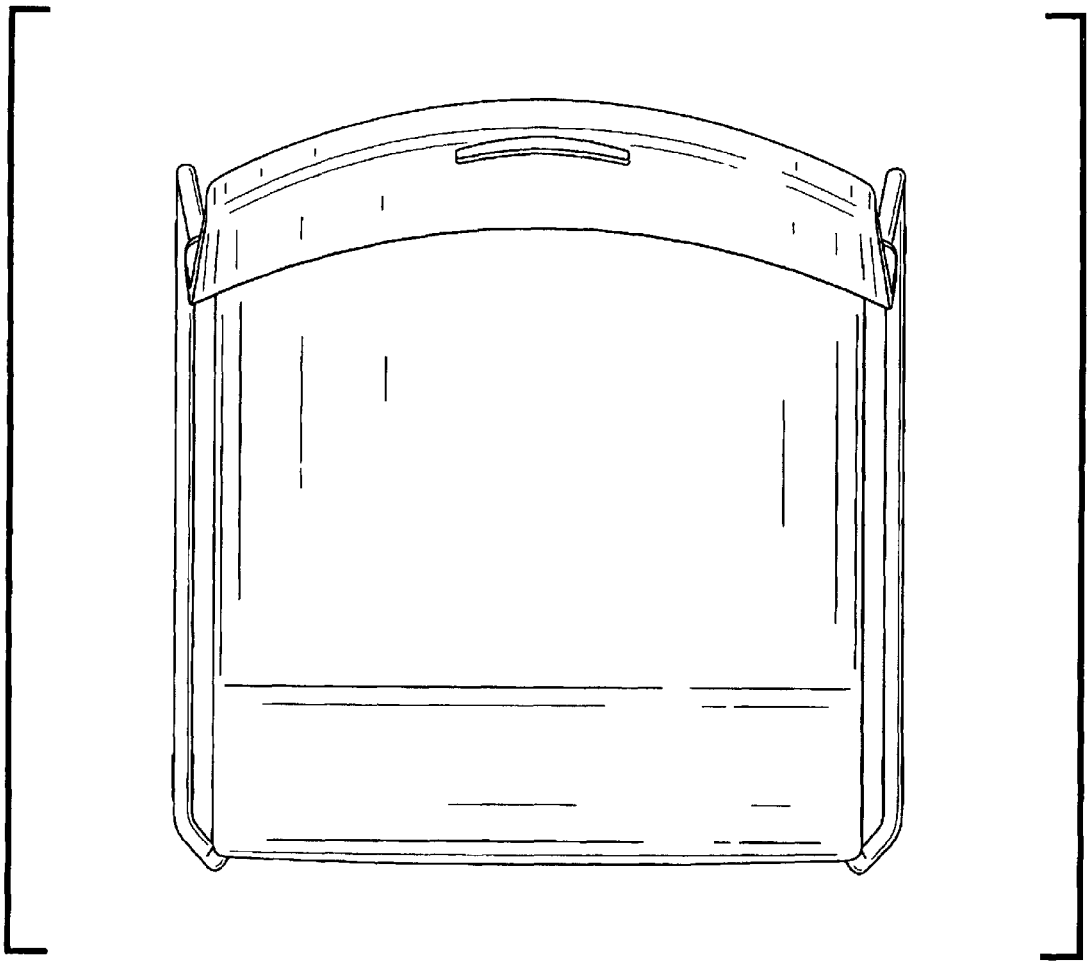
Figure 6:
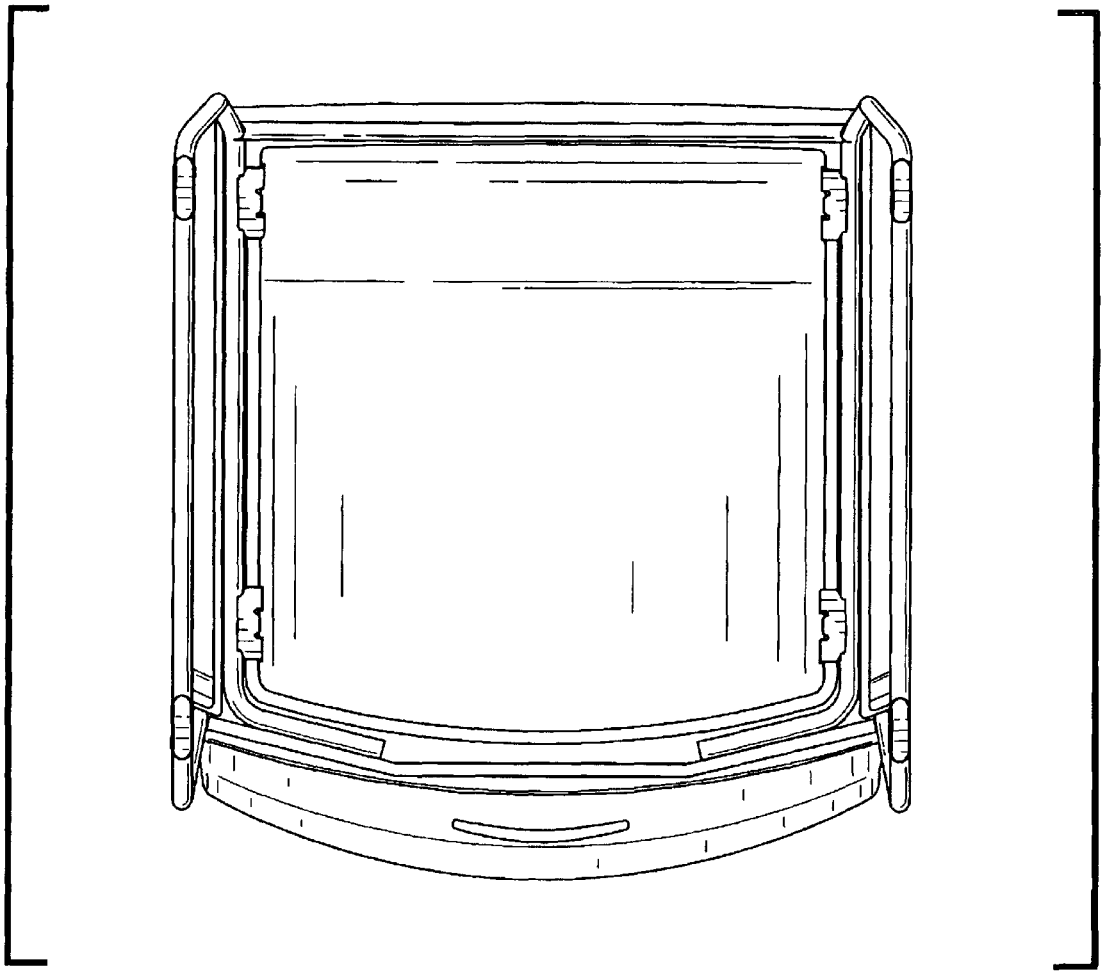

Matter enclosed in heavy brackets [ ] appears in the original patent but forms no part of this reissue specification; matter printed in italics indicates the additions made by reissue.

(CANCELLED)

U.S. PATENT DOCUMENTS

| | | | | | |
|---|---|---|---|---|---|
| D272,490 | S | | 2/1984 | Ogg | |
| D335,777 | S | | 5/1993 | Hess | |
| 5,383,712 | A | | 1/1995 | Perry | |
| D367,185 | S | | 2/1996 | Olson | |
| D378,553 | S | | 3/1997 | Newhouse et al. | |
| D382,415 | S | | 8/1997 | Leib | |
| D390,024 | S | | 2/1998 | DeJule | |
| RE36,335 | E | | 10/1999 | Perry | |
| D423,805 | S | | 5/2000 | Olson | |
| 6,109,696 | A | | 8/2000 | Newhouse et al. | |
| D433,578 | S | | 11/2000 | Saul | |
| 6,250,718 | B1 | | 6/2001 | Newhouse et al. | |
| D466,712 | S | | 12/2002 | Haney et al. | |
| D472,723 | S | | 4/2003 | Haney et al. | |
| D495,890 | S | | 9/2004 | Chadwick et al. | |
| 6,957,860 | B1 | | 10/2005 | Leist et al. | |
| D516,830 | S | | 3/2006 | Leist et al. | |
| D527,921 | S | | 9/2006 | Iida et al. | |
| D528,812 | S | | 9/2006 | Giugiaro | |
| D543,370 | S | | 5/2007 | Han | |
| D550,977 | S | | 9/2007 | Igarashi | |
| D558,478 | S | | 1/2008 | Rothe | |
| D569,644 | S | | 5/2008 | Kumazawa | |
| D600,465 | S | | 9/2009 | Kumazawa | |
| D600,953 | S | * | 9/2009 | Kumazawa | D6/502 |
| D600,954 | S | * | 9/2009 | Kumazawa | D6/502 |
| D609,487 | S | * | 2/2010 | Kumazawa | D6/373 |
| D617,568 | S | * | 6/2010 | Kumazawa | D6/373 |

OTHER PUBLICATIONS

Unpublished U.S. Appl. No. 29/336,795.
Unpublished U.S. Appl. No. 29/342,089.
Unpublished U.S. Appl. No. 29/342,092.
Unpublished U.S. Appl. No. 29/343,408.
Unpublished U.S. Appl. No. 29/343,410.
Unpublished U.S. Appl. No. 29/355,483.
Unpublished U.S. Appl. No. 29/362,092.

* cited by examiner

FIG. 1 (CANCELLED)

FIG. 2 (CANCELLED)

FIG. 3 (CANCELLED)

FIG. 4 (CANCELLED)

FIG. 5 (CANCELLED)

FIG. 6 (CANCELLED)

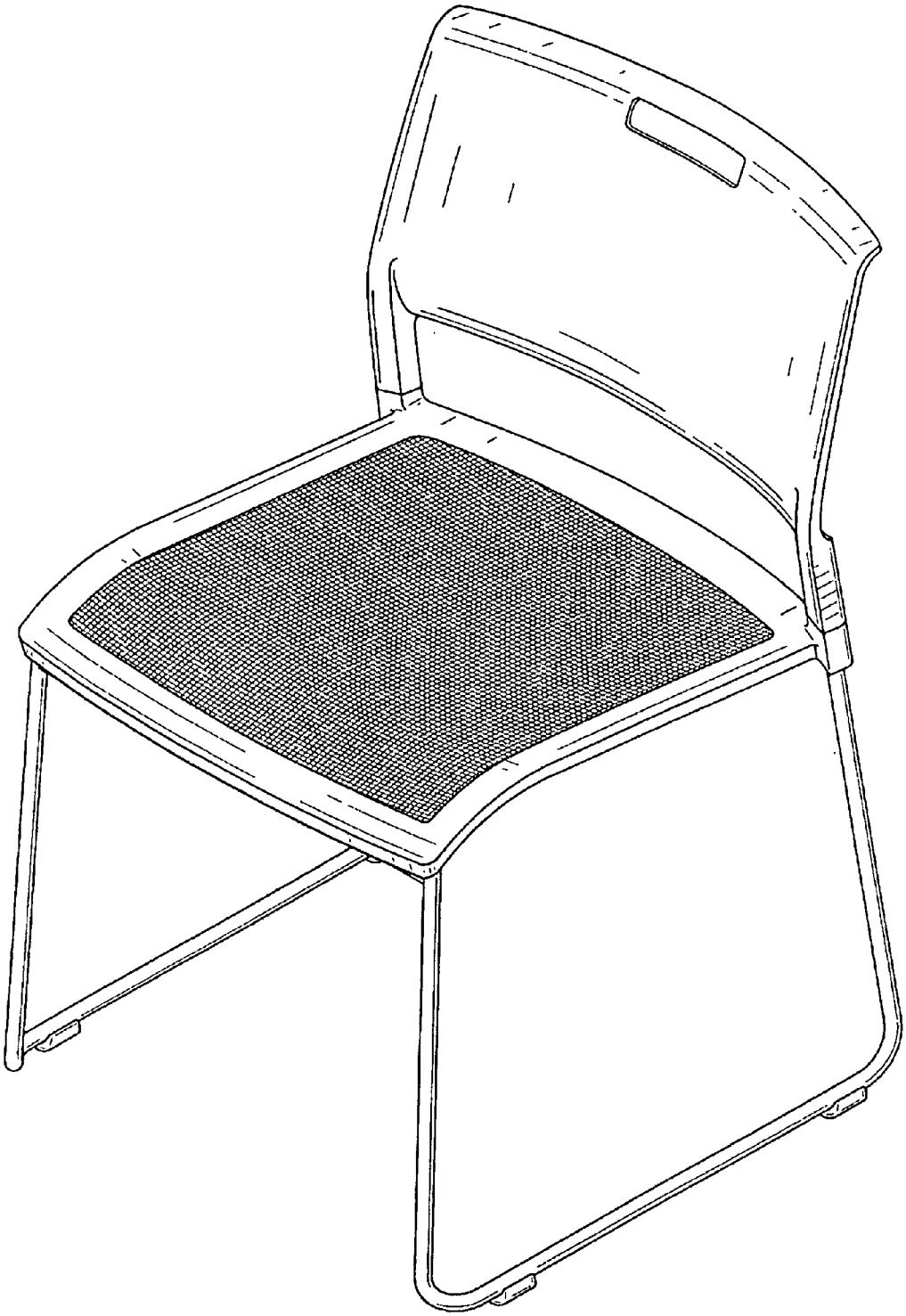
FIG. 7 (NEW)

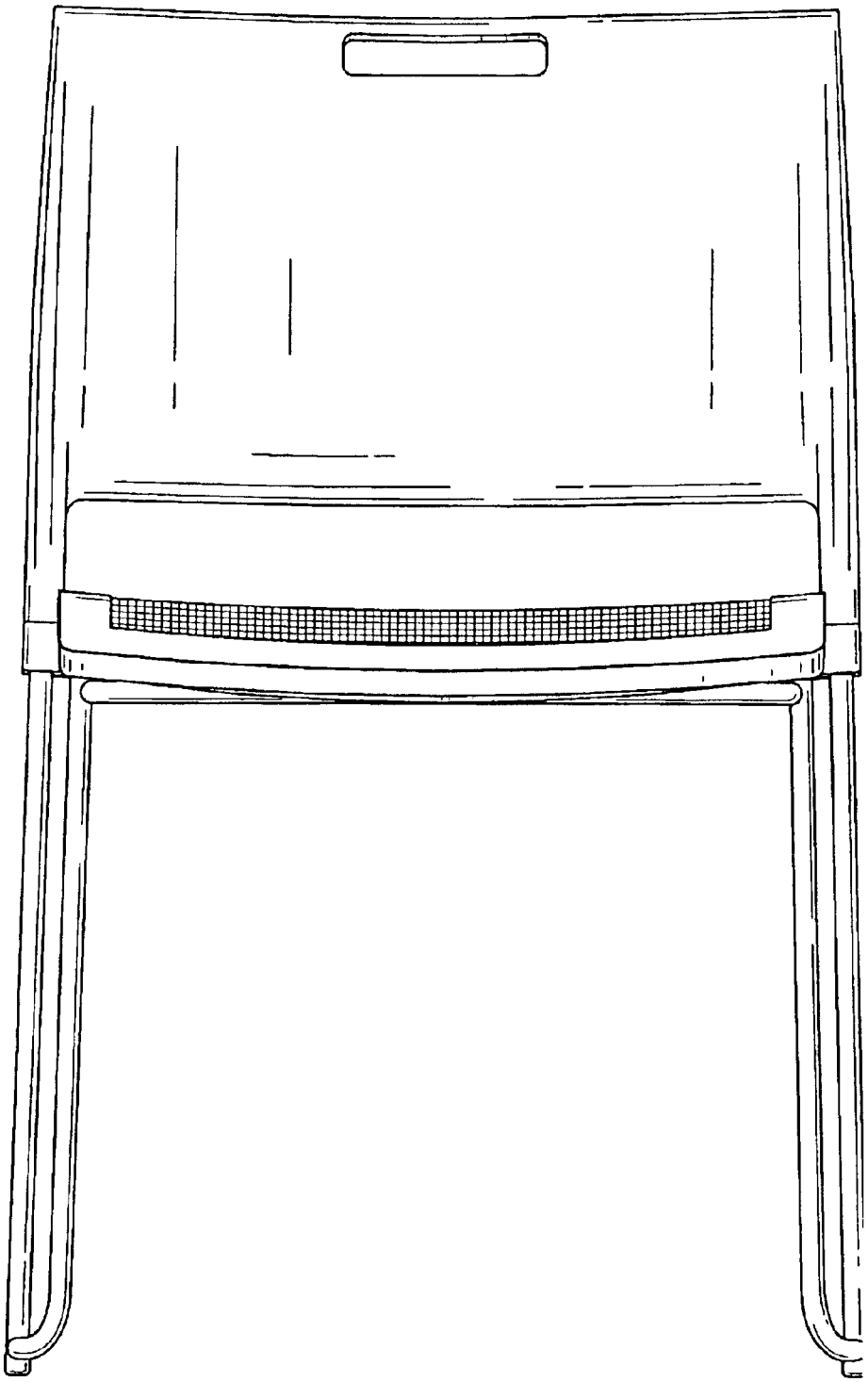
FIG. 8 (NEW)

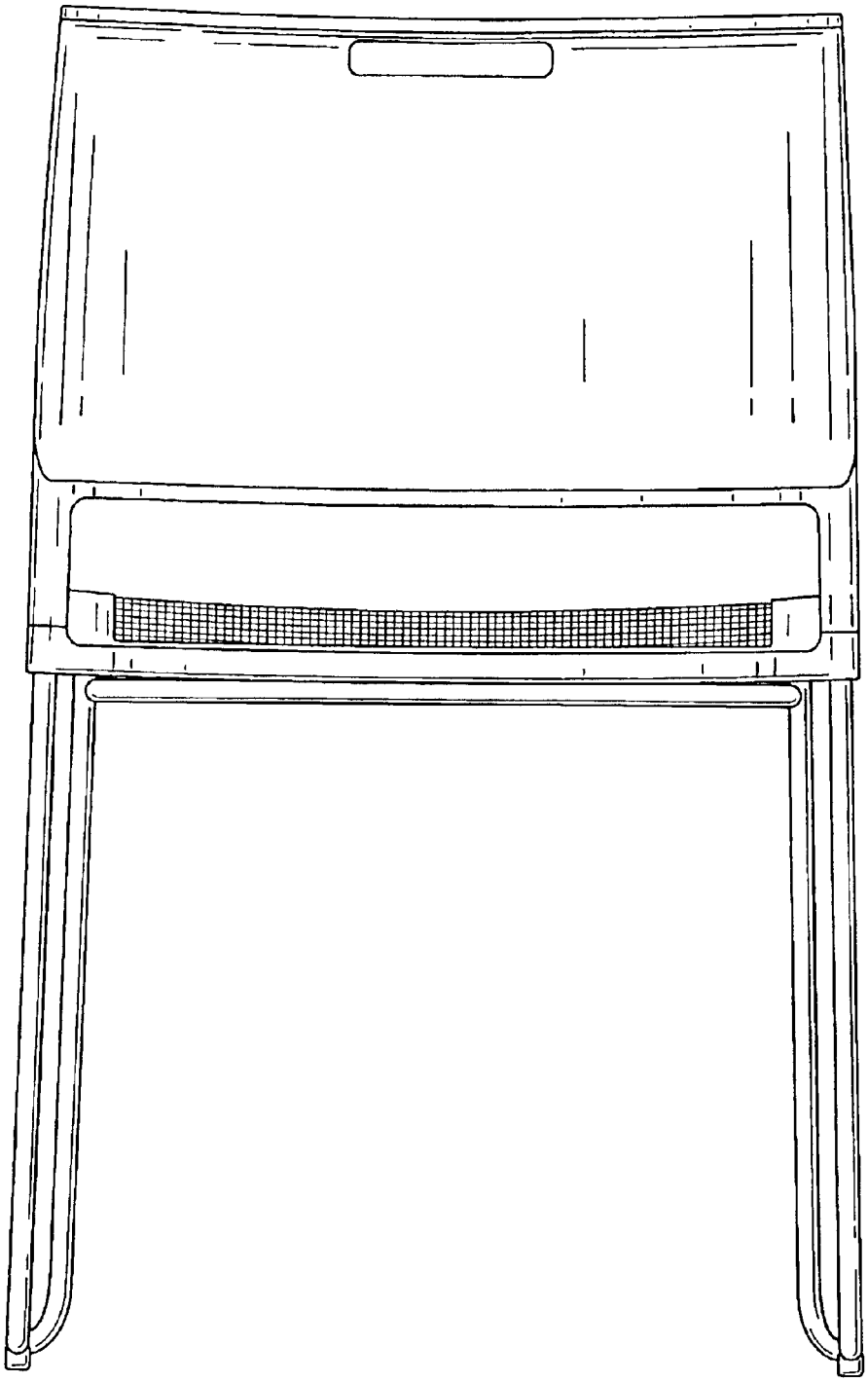
FIG. 9 (NEW)

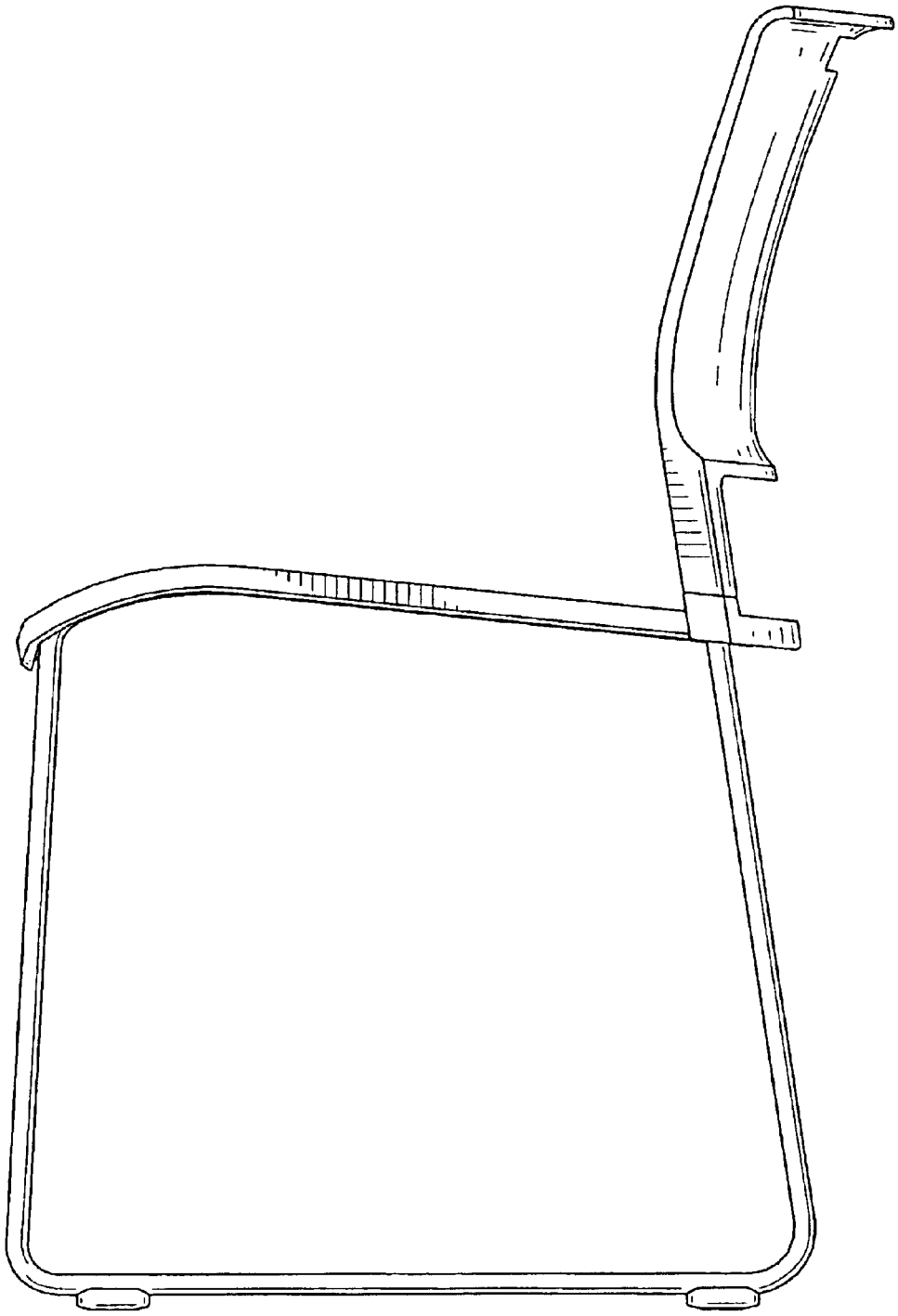
FIG. 10 (NEW)

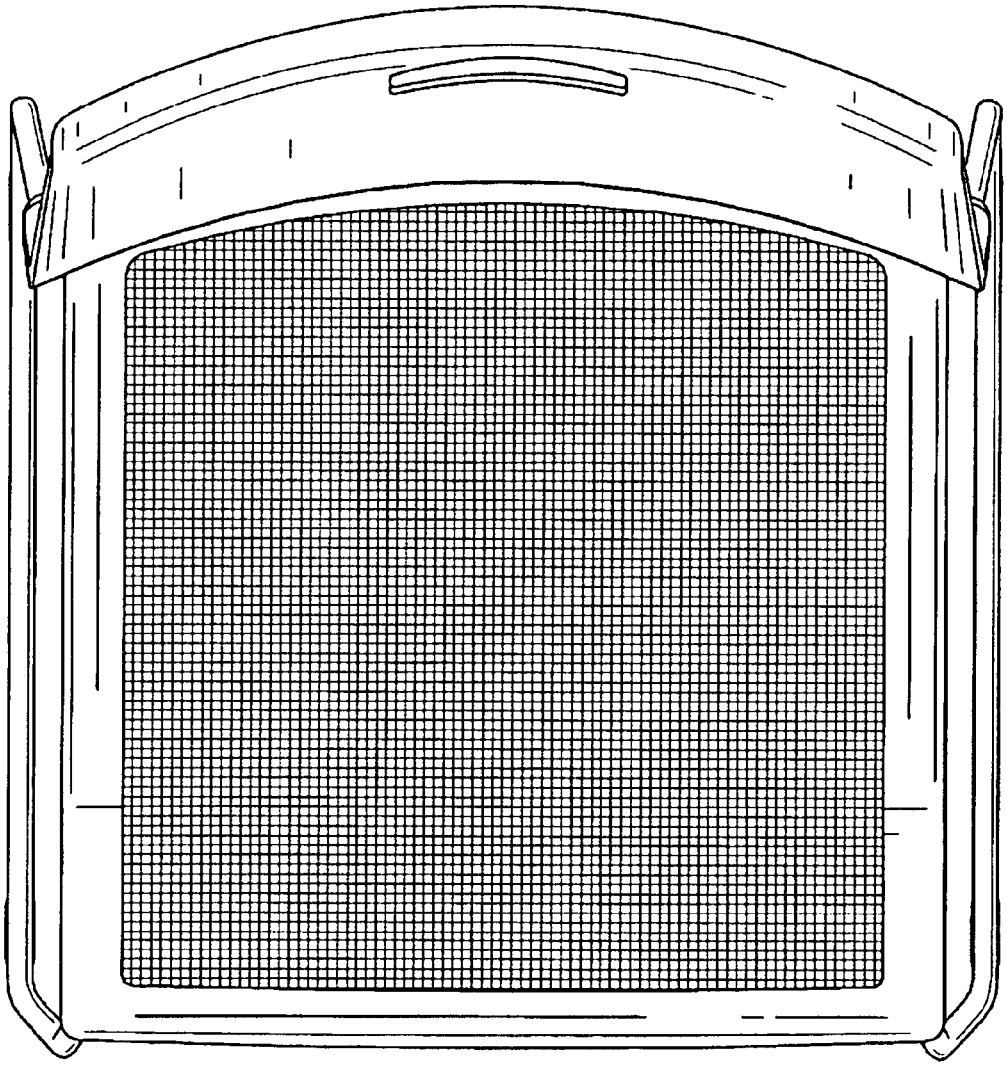
FIG. 11 (NEW)

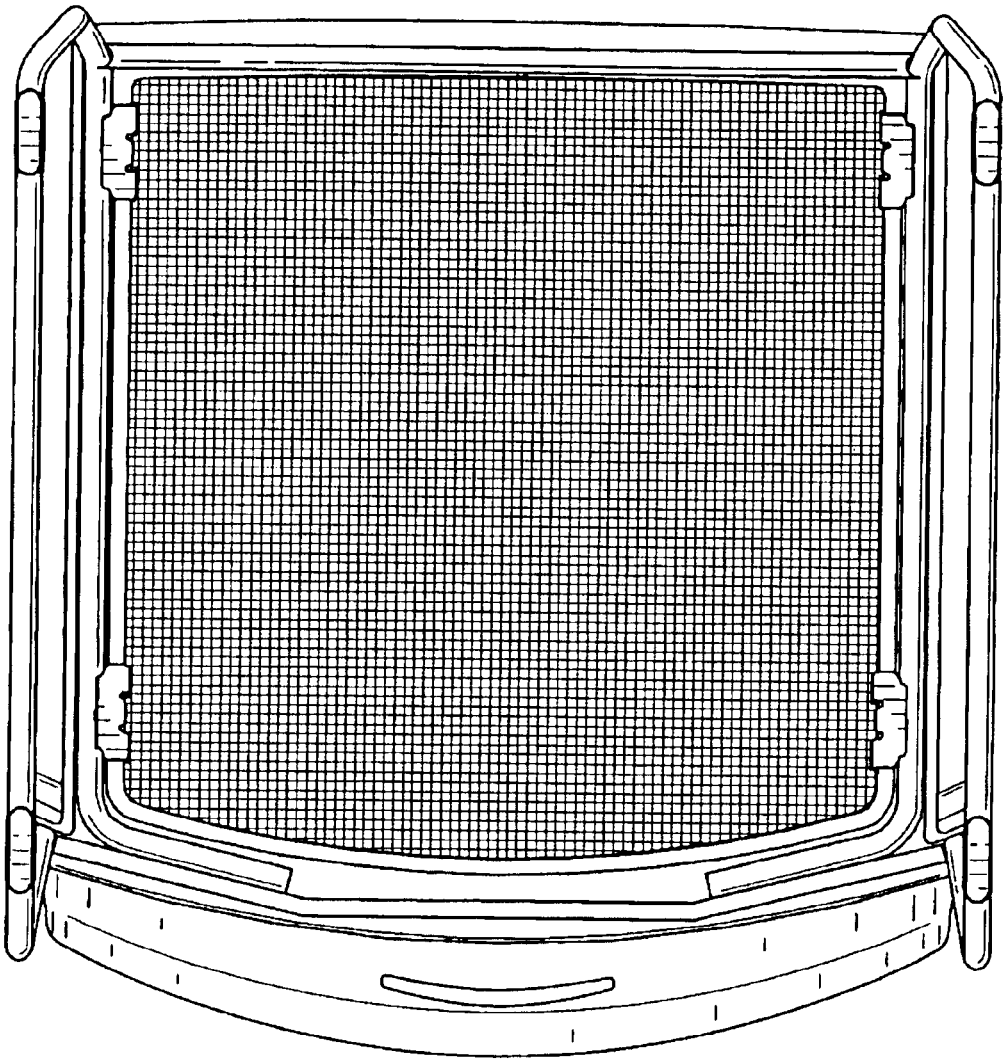
FIG. 12 (NEW)